United States Patent
Peyret et al.

(10) Patent No.: US 7,631,803 B2
(45) Date of Patent: Dec. 15, 2009

(54) SYSTEM AND METHOD FOR CHILD CARD PAYMENT

(75) Inventors: Patrice Peyret, Hillsborough, CA (US); Mordechai Teicher, Hod-Hsharon (IL)

(73) Assignee: Plastyc, Inc., New York, NY (US)

( * ) Notice: Subject to any disclaimer, the term of this patent is extended or adjusted under 35 U.S.C. 154(b) by 141 days.

(21) Appl. No.: 11/485,825

(22) Filed: Jul. 12, 2006

(65) Prior Publication Data

US 2007/0017976 A1 Jan. 25, 2007

Related U.S. Application Data

(60) Provisional application No. 60/700,383, filed on Jul. 19, 2005.

(51) Int. Cl.
*G06K 5/00* (2006.01)
(52) U.S. Cl. .............................. 235/380; 705/39; 705/44
(58) Field of Classification Search ................. 235/380; 705/44, 14, 39, 41
See application file for complete search history.

(56) References Cited

U.S. PATENT DOCUMENTS

| | | | |
|---|---|---|---|
| 4,454,414 A * | 6/1984 | Benton | 705/41 |
| 5,914,472 A | 6/1999 | Foladare et al. | 235/380 |
| 5,953,710 A | 9/1999 | Fleming | 705/38 |
| 7,006,993 B1 * | 2/2006 | Cheong et al. | 705/38 |
| 7,401,731 B1 * | 7/2008 | Pletz et al. | 235/380 |
| 2001/0037292 A1 | 11/2001 | Vogt | |
| 2001/0047310 A1 * | 11/2001 | Russell | 705/26 |
| 2004/0230495 A1 * | 11/2004 | Lotvin et al. | 705/26 |

FOREIGN PATENT DOCUMENTS

WO   WO/02/08869   1/2002

OTHER PUBLICATIONS

International Preliminary Report, PCT/US06/027505, Jul. 19, 2006.
International Search Report, PCT/US2006/27505, Sep. 25, 2008.
Written Opinion, PCT/US2006/27505, Sep. 25, 2008.

* cited by examiner

*Primary Examiner*—Michael G Lee
*Assistant Examiner*—Rafferty Kelly
(74) *Attorney, Agent, or Firm*—DLA Piper LLP US

(57) ABSTRACT

A transaction system suitable for payment by card includes a child account associated with a parent account. The transaction system receives from the parent a data set representing rules which specify on which purchases the child will benefit from an incentive such as discount, coupon, rebate or gift. Upon a purchase transaction with the child card, the system detects an eligible purchase by producing a result data set from the rules data entered by the parent and the particulars of the purchase transaction, where the result data represents the appropriate incentive granted, if any, and directs the system to charge the incentive cost to the parent account.

21 Claims, 11 Drawing Sheets

| LINE | ITEM | LIMIT | TIME | PROMOTION | COMMENTS |
|---|---|---|---|---|---|
| 001 | LUNCH AT "HAPPY TOMATO" | 1/DAY | | 70% DISCOUNT | UPON CHARGE |
| 002 | BOOKS FROM LIST | | | 70% REBATE | PROOF... |
| 003 | SCHOOL BUS | 2/DAY | | 100% DISCOUNT | UPON PURCHASE |
| 004 | THEATER SHOW FROM LIST | 1/MONTH | | 50% DISCOUNT + GIFT | UPON CHARGE |
| 005 | MOVIE FROM LIST | 1/WEEK | SAT+SUN | 70% COUPON | PRINT... |
| 007 | ... | ... | ... | ... | ... |

FIG. 12

| LINE | DATE | STORE | AMOUNT | DISC. | TOTAL | BALANCE |
|---|---|---|---|---|---|---|
| 001 | JAN 01 | CARRY-ON BALANCE | | | | 10.00 |
| 002 | JAN 01 | MONTHLY ALLOWANCE | 70.00 | | | 80.00 |
| 003 | JAN 03 | HAPPY TOMATO RESTAURANT | 5.00 | 3.50 | 1.50 | 78.50 |
| 004 | JAN 03 | MYBOOK BOOKSTORE | 10.00 | | 10.00 | 68.50 |
| 005 | JAN 03 | SCHOOL BUS CO. | 4.50 | 4.50 | 0.00 | 68.50 |
| 006 | JAN 04 | MYSHOW THEATER | 20.00 | 10.00 | 10.00 | 58.50 |
| 007 | JAN 07 | MYBOOK BOOKSTORE REBATE | 7.00 | | | 65.50 |
| 008 | JAN 07 | HAPPY TOMATO RESTAURANT | 10.00 | 7.00 | 3.00 | 62.50 |
| 009 | JAN 07 | MYCOFFEE CAFE | 10.00 | | | 52.50 |
| 010 | JAN 07 | MYMOVIE THEATER | 10.00 | CP 7.00 | 3.00 | 49.50 |
| 011 | ... | ... | ... | ... | ... | ... |

FIG. 13

| LINE | DATE | STORE | DISCOUNT | COUPON | REBATE | GIFT | BALANCE |
|---|---|---|---|---|---|---|---|
| 001 | JAN 01 | MONTHLY ALLOWANCE | | | | | 70.00 |
| 002 | JAN 01 | HAPPY TOMATO RESTAURANT | 3.50 | | | | 73.50 |
| 003 | JAN 03 | SCHOOL BUS CO. | 4.50 | | | | 78.00 |
| 004 | JAN 03 | MYSHOW THEATER | 10.00 | | | 8.00 | 96.00 |
| 005 | JAN 04 | MYBOOK BOOKSTORE | | | 7.00 | | 103.00 |
| 006 | JAN 07 | HAPPY TOMATO RESTAURANT | 7.00 | | | | 110.00 |
| 007 | JAN 07 | MYMOVIE THEATER | | 7.00 | | | 117.00 |
| 008 | ... | ... | ... | ... | ... | ... | ... |

688

SYSTEM AND METHOD FOR CHILD CARD PAYMENT

PRIORITY CLAIM

This application claims priority under 35 USC 119(e) and 120 from U.S. Provisional Patent Application Ser. No. 60/700,383 filed in Jul. 19, 2005 and entitled "System and Method for Child Card Payment" which is incorporated herein by reference.

BACKGROUND OF THE INVENTION

1. Field of the Invention

The present invention relates to transaction systems, and particularly to card payment systems for children.

2. Description of Related Art

Card payment systems are commonplace, allowing users to make payments using a credit or debit card. While credit card charges accumulate debt that the cardholder needs to settle periodically, debit card charges draw money from the funds available in an account. The terms "charge card" or "payment card" will be used hereinbelow to relate to both credit and debit cards.

A charge card is associated with an account that is established with and managed by a card issuer. The card issuer is an entity that manages payments on behalf of the cardholder, and can be a bank, credit card company, telephone company, workplace, school, etc. The charge card is accepted by participating merchants, who sign with a transaction acquirer, which can be the same or other than the card issuer. In a typical transaction, the merchant calculates the payment amount, the cardholder submits his card for payment, the card adequacy to pay is verified by a process called "authorization", the payment particulars are recorded by the merchant's POS (point of sale), and then, either in real time or as part of an end-of-day procedure, the transaction records are sent from the merchant to his acquirer for settlement. The transaction is finalized when the acquirer settles with the card issuer (if the issuer is another entity), and funds are transferred to the merchant's account on the one hand, and are charged to the cardholder's account on the other hand. Often the amount transferred to the merchant's account is slightly smaller than the one charged to the cardholder's account, the difference being a fee collected by the issuer, acquirer and/or an interchange network between the acquirer and the issuer.

The card is a means for a cardholder to identify his account and authorize transactions therewith. It can have the well-known form factor of a plastic card with embossment and magnetic stripe; it can be a contact or contactless smart card having a variety of form factors such as plastic card or a key fob; it can even be just a record of account details used for performing electronic transactions over the Internet or a cellular network.

FIG. 2 is a schematic block diagram that describes an exemplary card payment system 200 of the background art. A payment card 204 makes a payment transaction 208 with a merchant POS 212. The merchant POS 212 contacts charge back-end system 230 for making authorization 216. If the transaction is successfully authorized, the cardholder receives his merchandise or service from the merchant (not shown). The transaction particulars are then sent to charge back-end system 230 for settlement 220, either immediately or in a batch mode at the end of the day. The transaction is ultimately completed when the charge back-end system 230 makes a charge 234 to a user account 250 associated with payment card 204, and transfers the respective funds by a funds transfer 238 to a merchant account 260 associated with merchant POS 212.

The charge back-end system 230 of FIG. 2 is a representative of a large variety of systems of a wide range of complexities. It includes servers hosting databases and processing means, communication networks, and security infrastructures. Apparently, the most complex yet common representation of charge back-end system 230 is that of the common credit cards, involving a huge network of servers of issuing banks, servers of acquiring banks, servers of transaction processors and a huge international communication network. On the other extreme, a school payment system may have charge back-end system 230 implemented in a single personal computer that recognizes the student cards to charge parent-funded accounts for meals.

Of a special interest to the present invention are child accounts. Child accounts are established and funded by parents or legal tutors for allowing the children to make payments. FIG. 1A describes one arrangement wherein an ancillary child account 108 is actually a sub-account of a parent or tutor account 104. In this case, all transactions made by child card 150 are completed by direct charges to parent account 104. In an alternative arrangement of FIG. 1B, child account 138 is a separate account from parent account 130, possibly managed by another issuer, and funded by explicit transfers 134 from their parent account 130, or even by cash sent by the parent and deposited in child account 138. In both variations of FIGS. 1A-B, the child uses child card 150 to make charges 148 to the respective child account.

A closer look at ancillary child account 108 or child account 138, shows a log 112 which records all transactions received from charge back-end system 230 (FIG. 2) for queries and for producing monthly statements, a limit 116 that represents the instant amount that can be spent, and optionally also restrictions 120 entered by the parent, that determine at what merchants the card can be used, the number of transactions allowed per month, etc. Parent control 160 is a computerized control panel that uses Internet-based link 102 or the combination of links 102A and 102B to effect limit 116 (through child account replenishment or explicit funds transfer) and update restrictions 120. Limit 116 and restrictions 120 of FIGS. 1A and 11B express a fundamental desire of parents not only to provide payment means to their children but also to control how much can be spent and for what purpose. Several known systems teach various methods for restrictions 120 that determine how much a child can spend, at what merchants, and through what number of purchases.

All the control methods described above are authoritative in nature: they are limiting where, how much and how often a child can make purchases. They lack, however, the ability to positively encourage certain purchases over other purchases.

There is thus a need for, and it would be advantageous to have, card-based payment solutions that will allow parents to positively encourage their children to prefer certain purchases over other purchases.

BRIEF SUMMARY OF THE INVENTION

The present invention seeks to provide systems and functionalities for allowing parents to encourage their children to prefer certain purchases over other purchases.

In its broadest sense, the present invention provides a parent with means to define and implement incentive options to effect the purchase patterns of his or her child. For example, if a parent selects to encourage his child to buy health food in spite of its higher price and less-desirable taste, the present invention allows the parent to promote purchases of health food by any or all of a discount, coupon, rebate, gift, and other attractions that may drive the child toward the desired direction. The cost of promoting actual purchases made by the child is then charged to the parent account.

There is thus provided, in accordance to preferred embodiments of the present invention, a computer-assisted transaction method between a first card and card account intended for a child, and a second account, associated with the first account, and controlled by a second account owner who is e.g. a parent or tutor of the child. The transaction method includes: receiving rule data from the second account owner that associate certain condition data relative to usage of the child card with corresponding result data, receiving the child card for making payment for a purchase, comparing the purchase particulars to the rule data to derive the result data, and using the result data to define how much, if any, of the cost of the purchase transaction is charged to the parent account instead of the child card account. It will be understood that the expression "result data" refers to the fact these data will be the result given upon a successful comparison with the corresponding condition data. In fact, the result data will normally comprise a value representing a cost, or another parameter or rule making it possible to derive a cost from the particulars of a transaction meeting the corresponding condition data.

There is also provided, according to preferred embodiments of the present invention, a transaction system, that includes a first account and associated card, intended for a child to effect payments from the account, a merchant POS (point of sale) for receiving the child card for payment, a second account owned by a parent or tutor of the child, a computer system accessible by the parent or tutor owning the second account after proper identification for entering rule data that associate certain condition data representative of possible purchases by the child card with corresponding result data representative of intended incentives, a computer interface accessible by the child after proper identification for viewing the rule data entered by the parent into the computer system, and a back-end system operative to cooperate with the parent-accessible computer system to receive the rule data, cooperate with the child-accessible computer interface to show the rule data, receive from the POS the condition data representative of the particulars of a purchase, compare the particulars to the rule data, derive the actual result data corresponding to the match of one or more condition data, and finally charge to the parent account the appropriate part of the cost that would normally be incurred by the child card account.

Exemplary classes of result data include representations of a discount, coupon, rebate and gift. Some condition data representative of purchases may not match any of the rules data and therefore may produce result data that does not shift charge costs from the first card account to the second parent account, while others may match one or more of the rule data and yield one or more result data generating one or more cost shifts. The condition data representative of purchase particulars are received from the merchant's POS (point of sale) and/or from proof-of-purchase evidence provided by the child.

BRIEF DESCRIPTION OF SEVERAL VIEWS OF THE DRAWINGS

The present invention will be understood and appreciated more fully from the following detailed description, taken in conjunction with the drawings in which:

FIG. 12 is a simplified table describing exemplary incentive rules according to a preferred embodiment of the present invention.

FIG. 13 is a simplified table describing an exemplary child statement according to a preferred embodiment of the present invention.

DETAILED DESCRIPTION OF THE INVENTION

Figure 1A:
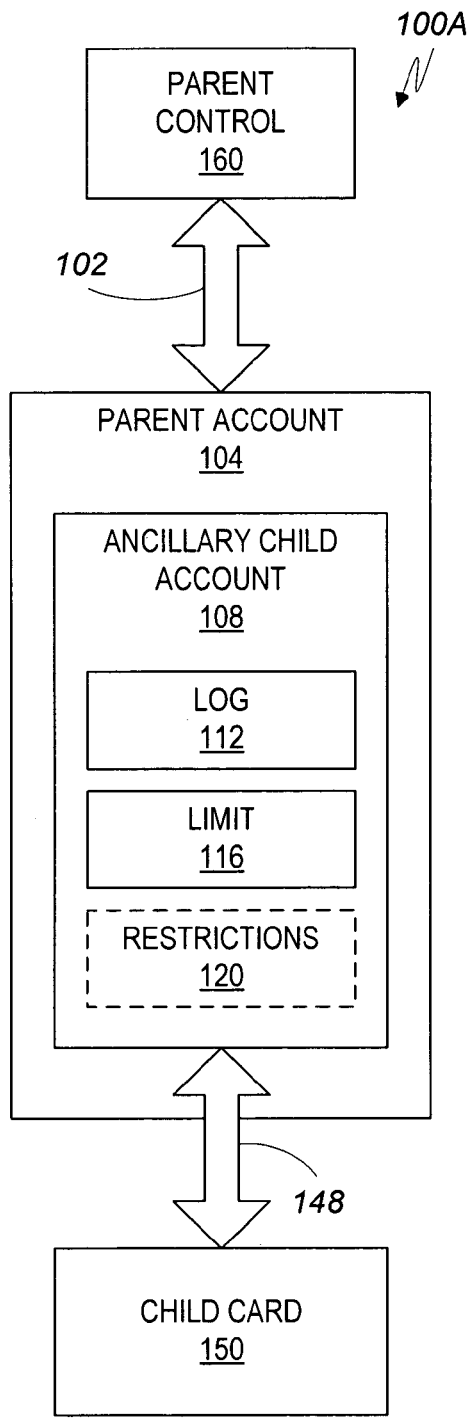
FIG. 1A is a simplified block diagram describing a child account of the background art.
Figure 1B:
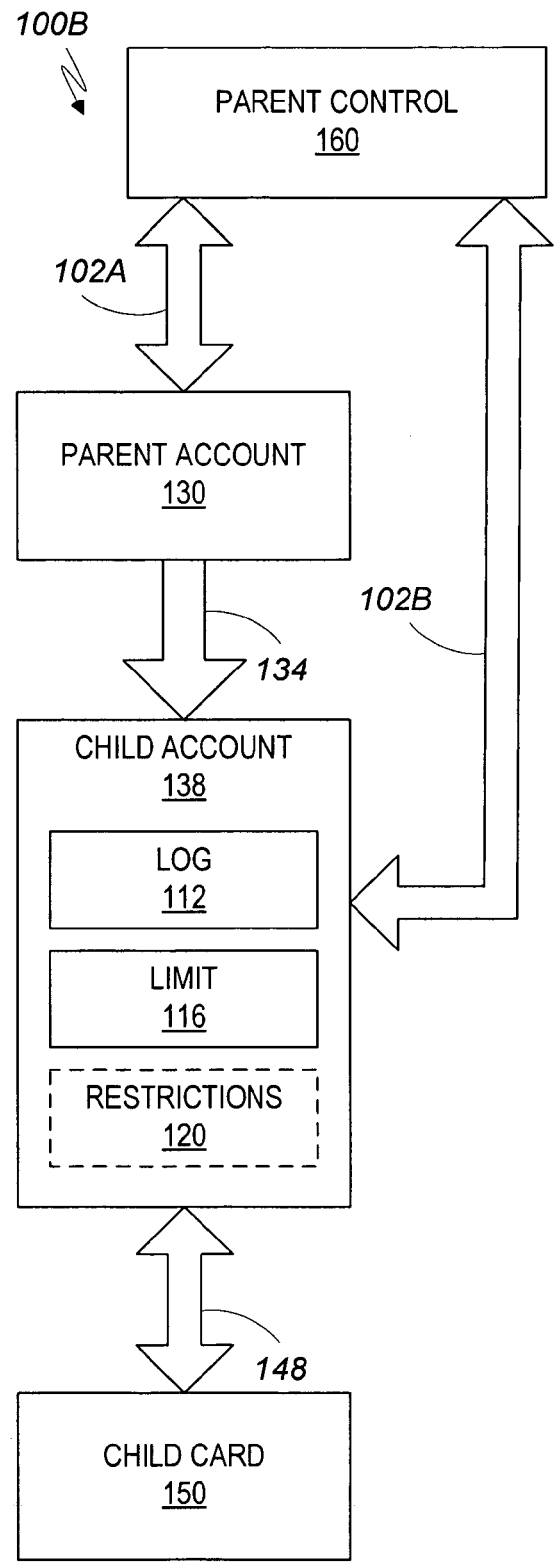
FIG. 1B is a simplified block diagram describing another variation of a child account of the background art.
Figure 3:
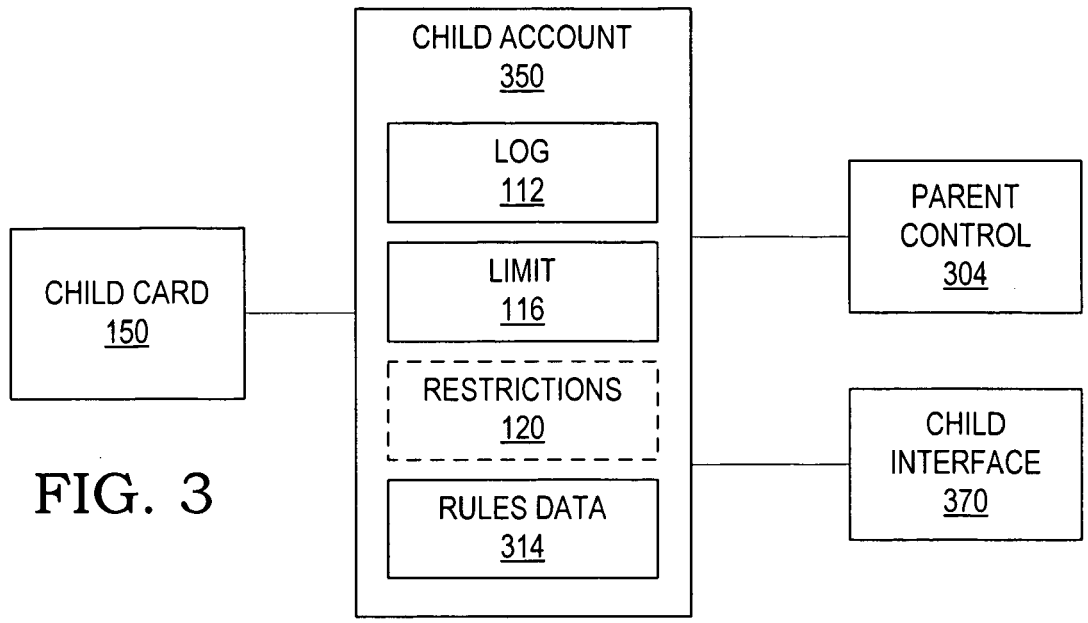
FIG. 3 is a simplified block diagram of a child account according to a preferred embodiment of the present invention.

Reference is made to FIG. 3, which schematically describes a child account 350 according to an implementation of a preferred embodiment of the present invention. Child account 350 is hosted on an issuer server (not shown), and is preferably configured with respect to a parent account under either of the arrangements of FIGS. 1A-B. Log 112, limit 116 and optional restrictions 120 are as described above with respect to the background art of FIGS. 1A-B. Rules data 314 representing incentives are devised to encourage certain purchase patterns selected by the parent using parent control 304 that is preferably implemented as a page on a browser run on a personal computer and communicating with the issuer server that hosts child account 350 through an Internet-based link. The incentives may include discount, coupon, rebate or gift incentives as described below in more detail. Child interface 370 is used by the child to view details of his account 350, and optionally view the details of the rules data 314 representing incentives entered by the parent; child interface 370 is preferably implemented as a page on a browser run on a personal computer and communicating with the issuer server that hosts child account 350 through an Internet-based link. It would be noted that the rules data 314 of the present invention can co-exist with other parent-controlled data elements introduced by the background art such as limit 116 and optional restrictions 120. The child account system shown in FIG. 3 may be implemented in other manners that are within the scope of the invention.

Figure 3A:
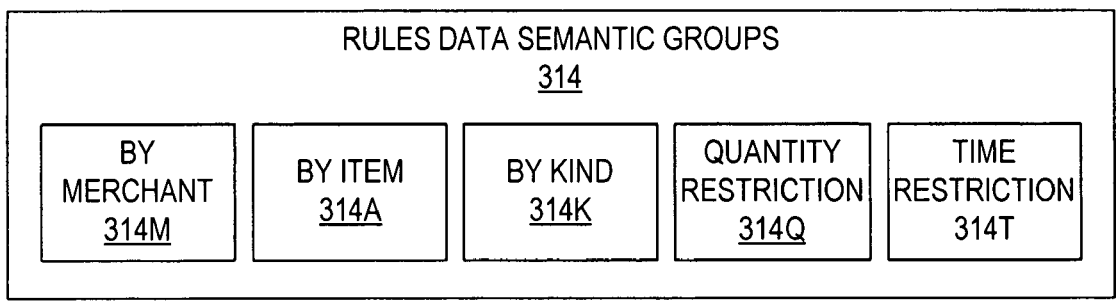
FIG. 3A is a simplified block diagram describing five preferred kinds of rule data semantics representative of various types of decisions that can be made on condition data.

FIG. 3A describes rules data 314 of FIG. 3 in more detail. Rules data 314 are computer-interpretable criteria that are devised to encourage certain purchase patterns of the child. Each rule is preferably a piece of computer code that associates certain condition data representing (potential) purchases with corresponding result data from the set of result data semantics 312 (see FIG. 4). Thus, if and when the child makes an actual purchase of which the conditions data matches one or more of the rules data from 314, the system of the present invention will execute the respective rule, thereby producing a result which will shift some of the costs of the purchase transaction from the child account to the parent account, thus having the effect of granting the child the corresponding incentive. Rules data 314 can be semantically categorized by the method of identifying condition data representing eligible purchases that entitle the child to obtain the corresponding incentive. The semantics of rules data by merchant 314M define a rule that implies that products purchased at a certain merchant will benefit from a specified incentive; condition data representing purchases made at the school cafeteria, a specific health food restaurant and the school bus company, are examples of parameters for rules data by merchant 314M. The processing of rules data by merchant 314M usually involve cooperation between the merchant and the payment system of the present invention, and therefore can support all four methods of FIG. 4 below.

The semantics of rules data by item 314A are intended to implement an incentive for a child to purchase a certain item, for example visit a certain movie or buy a certain music CD, irrespective of the merchant who sells the item; for practical considerations, such items are more suitable for rebates or gifts upon presenting proof-of-purchase evidence, since some merchants that sell eligible items may not participate in a system constructed in accordance to the present invention. However, a combination of the rules data representing incentive by merchant 314M and incentive by item 314A may make all incentive methods of FIG. 4 applicable also for specific items; thus, the child may be directed to certain department store that participate in the system of the present invention in order to benefit from incentives on certain, pre-defined items only.

The semantics of rules data by kind 314K are intended to implement an incentive encouraging the child to make certain kinds of purchases, such as visiting a museum, a concert hall or a theater, irrespective of the specifics of the product or event. Such rules data can be operated on with both participating and non-participating merchants, under similar considerations to those of incentives by item 314A described above.

The semantics of rules data by quantity 314Q are intended to implement optional restrictions superimposed on and combined with the semantics of the rules data by merchant 314M, by item 314A and by kind 314K described above. The semantics of such data impose quantity restrictions on purchases eligible for incentives, for example by monthly, weekly or daily limits, measured by units or by cost. Thus, a parent may wish to heavily subsidize a meal at a health food restaurant for his child, but may not wish to do so for his child's friends; in such a case, the parent may insert a restriction data element under quantity restrictions 314Q to limit subsidized purchases at that restaurant to, for example, one meal per day or 20 dollars per month.

The semantics of rules data by time 314T are intended to implement time restrictions which can be optionally superimposed on and combined with the semantics of the rules data by merchant 314M, by item 314A and by kind 314K described above. They define, for example, deadlines, specific weekdays or specific hours that are required for a respective incentive. Thus, a parent may wish to encourage his child to buy a new outfit toward a holiday and may heavily subsidize the respective purchase but only if made by a specified date. In another example, a parent may provide incentives for visiting a movie only on Saturday and Sunday, or only at afternoon shows.

Figure 4:
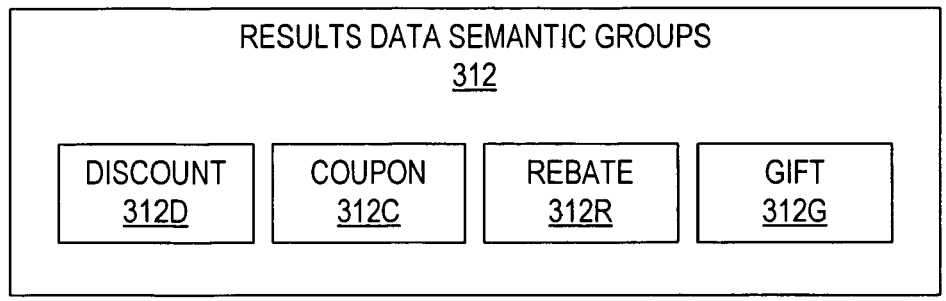
FIG. 4 is a simplified block diagram describing four preferred types of result data semantics representative of the various types of cost shifts between the first and the second account.

FIG. 4 provides more details of the results data 312, which preferably is computer-interpretable code that represent enticements of monetary value, into four incentive classes. The discount 312D data class determines a discounted price that will be effected upon back-end system 340 (FIG. 5) recognizing child account 350 through child card 150. This class of semantics can implement two variations: discount-upon-purchase, wherein the amount shown on the purchase receipt is discounted; and discount-upon-charge, wherein the amount on the receipt shows the full price, but the actual charge, as shown in the monthly statement, is a discounted price. A coupon 312C data class represents directly or generates a paper coupon printed by the child using his personal computer's printer, or an electronic coupon code that is recognized during an electronic purchase made via the Internet, cellular phone or telephone order; the coupon will grant the child, upon or following a purchase, customary privileges such as a discount, enhanced product or a gift. The semantics of the rebate 312R data class involves making purchase for a full price, and then getting a predefined monetary return into the child account when presenting a proof-of-purchase in electronic or paper format. The gift 312G data class represents offers made to the buyer of a predetermined, or a selectable gift of a predefined value, upon or after making a certain purchase.

It will be appreciated that the applicability of certain options of the present invention depends on the cooperation of merchants. Participating merchants preferably program their POS and accounting systems for accommodating all or selected incentive semantics represented by the results data classes of FIG. 4, but even non-participating merchants can be addressed, by a system constructed in accordance to preferred embodiment of the present invention, by using the results data classes 312R (incentives by rebate) or 312G (incentives by gift), by having the child collecting conventional paper or electronic receipts and presenting them as a proof-of-purchase evidence for claiming the incentives, as will be described below.

It will be also noted that while the present invention is about incentives initiated by the parent and charged to the parent account, such incentives can co-exist and even cooperate with conventional sales-promotion incentives by merchants and manufacturers. It will be also noted that when merchant and manufacturer incentives are implemented, such incentives, in the form of discount, coupon, rebate and/or gift, can be presented to the child through child interface 370 in a similar format to parent-initiated incentives as demonstrated in FIG. 12. It will be further noted, that some embodiments of the present invention may offer parents the option of mixing merchant incentive with parent incentives in a way that will be inseparable by the child, so that the parent incentive specifics will be masked; then, combined incentives will also be supported, e.g. the child may see a 70% discount on lunches in a certain health food restaurant (FIG. 12) but the parent will be charged only for 50% discount while the restaurant will bear the 20%. Also, in some embodiments of the present invention, the parent may use parent control 304 to approve or disallow some merchant or manufacturer incentive initiatives, since some promotions may be found undesirable by the parent.

Figure 2:
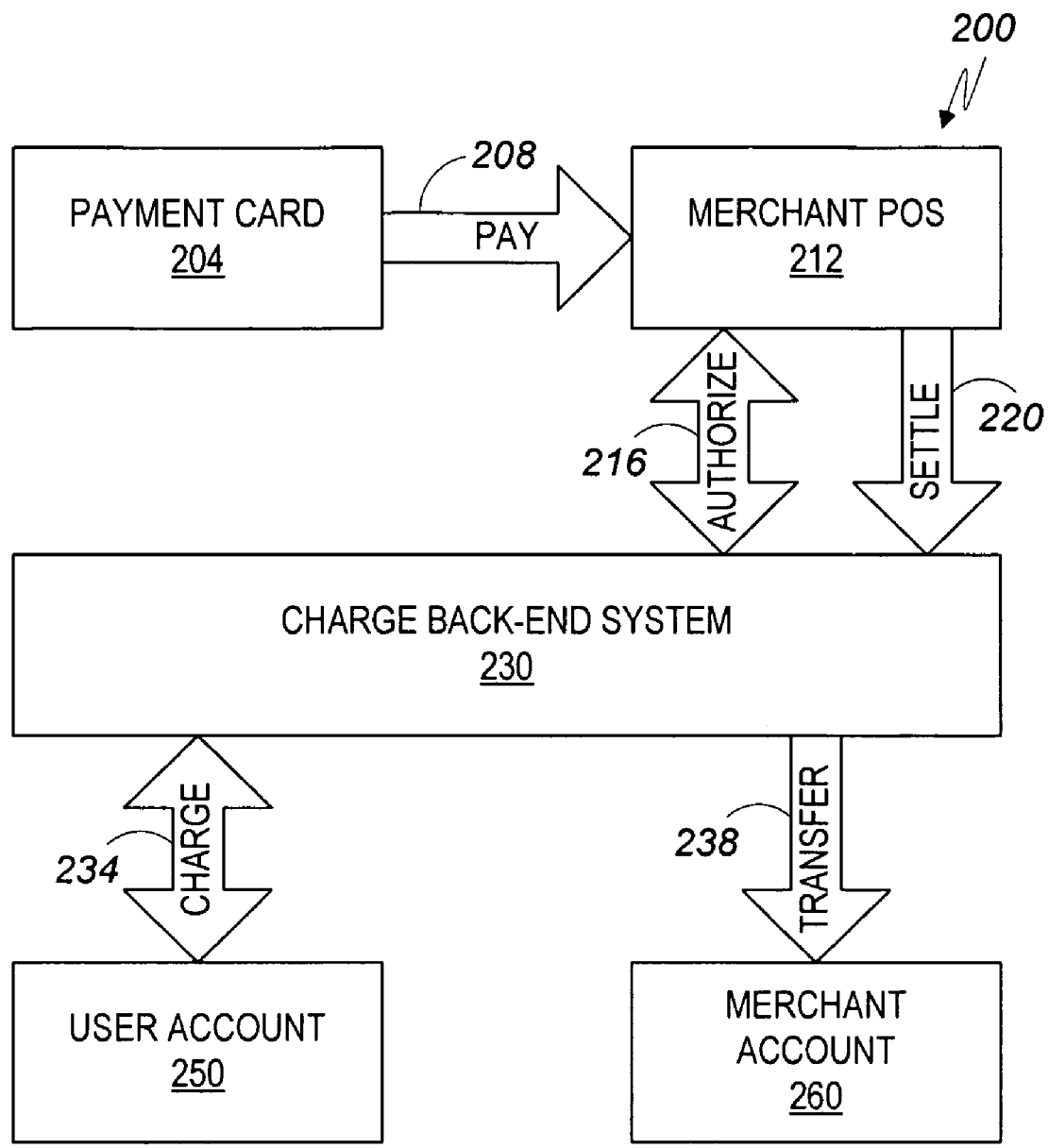
FIG. 2 is a simplified block diagram describing a card payment system of the background art.
Figure 5:
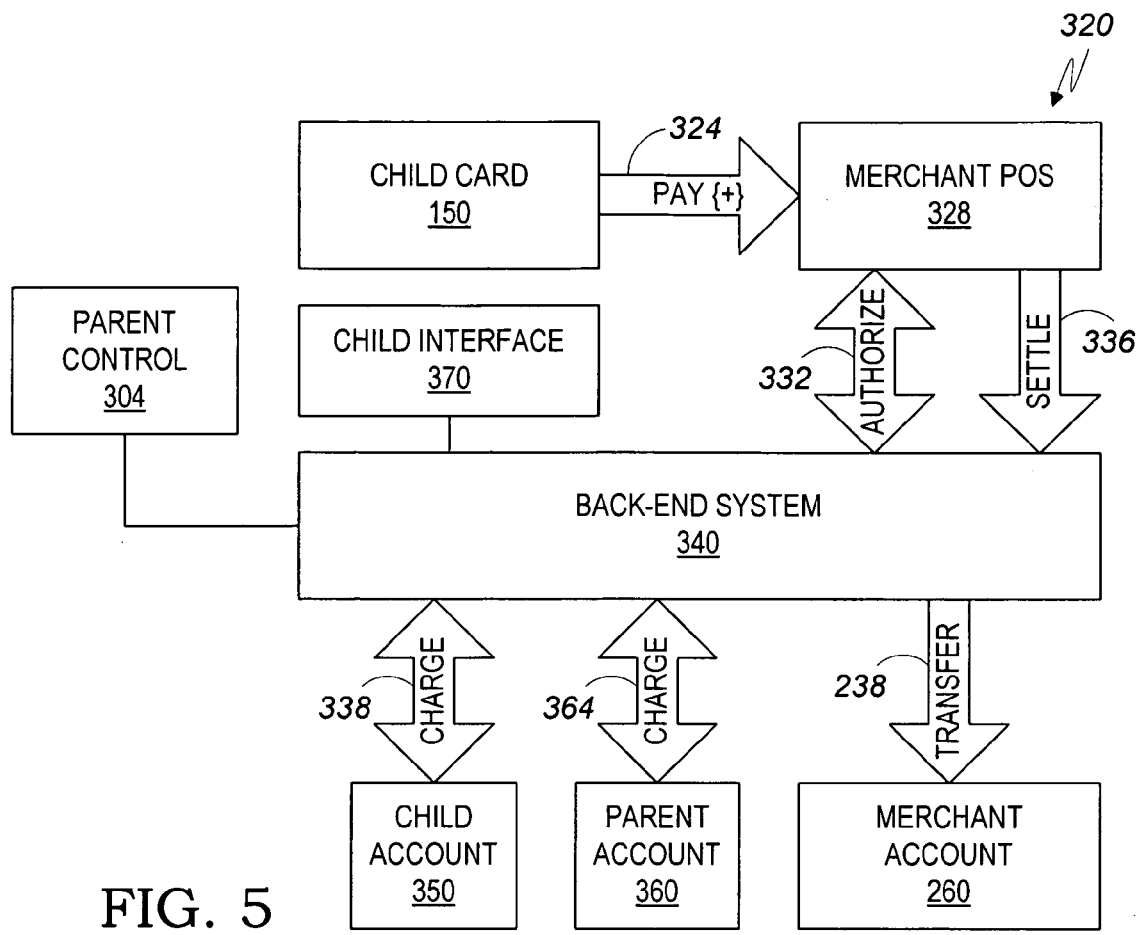
FIG. 5 is a simplified block diagram describing a preferred embodiment of a system constructed according to a preferred embodiment of the present invention.

FIG. 5 describes an exemplary implementation of a system 320 constructed in accordance to a preferred embodiment of the present invention while other implementations are also within the scope of the invention. Child card 150 makes a payment transaction 324 with a merchant POS 328. Payment transaction 324 includes conventional payment particulars, and optionally also may be effected by one or several classes of results data representing the parent incentives of the present invention. Likewise, merchant POS 328 is configured to receive conventional payment particulars, and optionally also to interpret certain classes of results data (primarily the data elements representing discounts and coupons) according to the present invention. It will be noted, as already explained above, that the present invention allows parent incentives (primarily those represented by results data expressing rebates and gifts) to be processed with purely conventional POS, and then merchant POS 328 can be a merchant POS 212 of the background art (FIG. 2). Merchant POS 328 conducts authorization 332 and settlement 336 with back-end system 340 as will be described in more detail below. Parent control 304 is preferably implemented within a Web browser on the parent's personal computer, communicating with back-end system 340 for entering the parent's selected rules data into rules data field 314 (FIG. 3) of child account 350, as well as selectably transferring funds from parent account 360 to replenish child account 350. Back-end system 340 interfaces with child account 350 for child charges and reports 338; it interfaces with parent account 360 for parent charges and reports 364; and with merchant account 260 for funds transfers 238 that finalize the payment transactions from the merchant's perspective. According to the present invention, with respect to a specific purchase, the amount of funds transfer 238 equals the amount of the respective charge 338, plus the amount of the respective charge 364, minus, possibly, a transaction fee charged by the operators of back-end system 340.

It will be noted that child account 350, parent account 360 and merchant account 260 are essentially database records, hosted on servers that are managed by card issuers and transaction acquirers. Back-end system 340 is hosted on one or more servers. Thus, the system of FIG. 5 usually encompasses a plurality of physical servers and communication networks, but can also, in an extreme minimal case such as a school payment system, host back-end system 340, a plurality of child accounts 350, and a merchant account 260, on a single personal computer, while the respective parent accounts 360 can be, for example, conventional credit card accounts hosted by credit card issuers. It will be noted that merchant POS 328 includes at least the functionalities of receiving a payment amount and communicating with back-end system 340 for authorizing and executing the payment; however, merchant POS 328 can also include the functionalities of a "scanner" and/or "cash register" that identifies the purchased items and calculates prices and totals. Merchant POS 328 can be of the kind used by a brick-and-mortar merchant and physically receive and read child card 150, or can be of the kind operated by an Internet or mobile merchant and receive the particulars of a virtual child card 150 over the Internet, mobile or telephone network.

It will also be noted that for clarity, the present invention is described in most diagrams and descriptions with reference to a single child account, a single parent account and a single merchant account and POS. Obviously, the invention relates to transactions and systems that usually serve a plurality of children, parents and merchants and their respective accounts, cards and POS.

Figure 6:
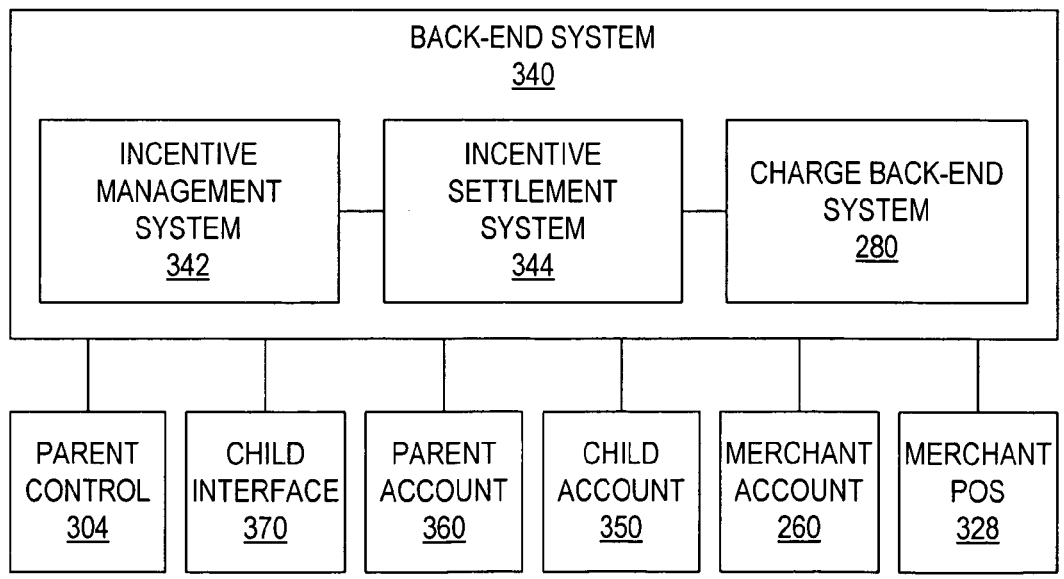
FIG. 6 is a simplified block diagram of a back-end system according to a preferred embodiment of the present invention.

FIG. 6 zooms into back-end system 340 of FIG. 5. Thus, back-end system 340 includes a conventional charge back-end system 280 for charging amounts to parent account 360 and child account 350 and transferring funds to merchant account 260. Incentive management system 342 (preferably one or more pieces of software code executed by a computer system with one or more modules as described below in FIG. 7) receives rules data from the parent through parent control 304, records them into rules data field 314 of the respective child account 350, and presents them to the child through child interface 370. Parent control 304 and child interface 370 are preferably Web browser screens on the parent's and child's personal computers, respectively. Incentive settlement system 344 (preferably one or more pieces of software code executed by a computer system with one or more modules as described below in FIG. 8) is responsive to transactions from merchant POS 328, to rules data retrieved from rules data field 314 of the respective child account 350, and to proof-of-purchase evidence (not shown) received from the child by conventional mail (e.g. in the form of paper receipts) or through child interface 370 (e.g. in the form of electronic receipts or purchase report). Incentive settlement system 344 is then activated to selectively generate the results data (such as data elements representing discount, coupon redemption, rebate or gift) and accordingly splitting the charge between child account 350 and parent account 360, accompanied by entering the respective details into the transaction logs of the parent and child account for future generation of monthly statements (see FIGS. 14-15 below).

It will be noted that the relationship between merchant POS 328 and back-end system 340 may vary. A merchant POS 328 that is not participating in the present invention generates conventional charge transactions and conventional paper or electronic receipts. However, the child may send such receipts to incentive settlement system 344, and potentially effect rebates and gifts funded by the parents, with the merchant being unaware of them. Also, a non-participating merchant can receive payments conventionally, while a discount-upon-charge arrangement with back-end system 340 supports a discount incentive that is initiated and funded by the parent. The above implies that even without the cooperation of a certain merchant, the system of the present invention can be implemented with respect to purchases made with that certain merchant, through cooperation among back-end system 340, parents and children. However, if the merchant does participate in the present invention, then merchant POS 328 can be programmed accordingly to allow discount-upon-purchase and coupon reception, which enrich the offering of the present invention.

Figure 7:
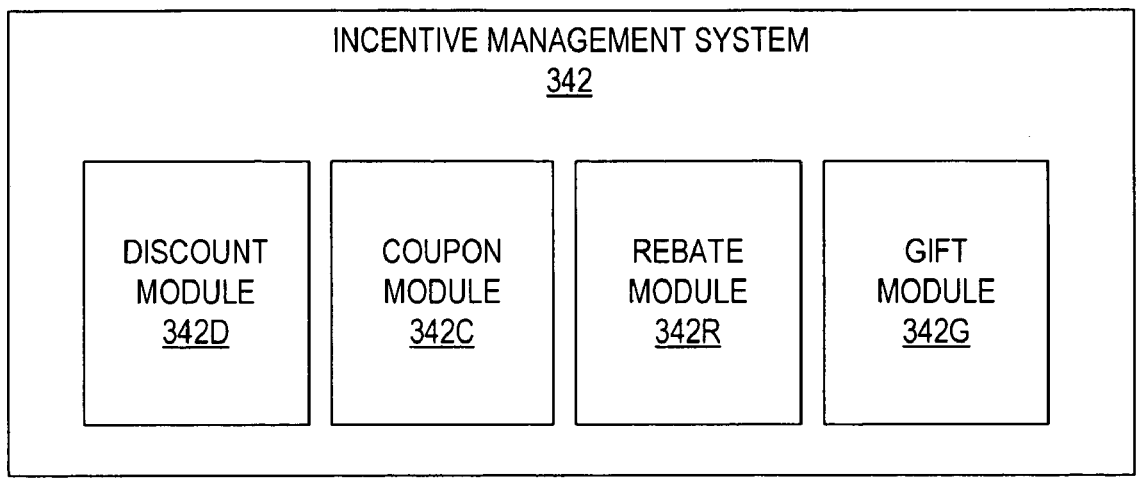
FIG. 7 is a simplified block diagram of an incentive management system according to a preferred embodiment of the present invention.

FIG. 7 zooms into the main modules of incentive management system 342 of FIG. 6. Exemplary demonstrating rules data entered into incentive management system 342 will be described with reference to FIGS. 13-15 below. Discount module 342D receives from the parent, through parent control 304, the rules data selected by the parent for generating discounts data results. The semantics of the rules data define the items, item kinds, merchants, quantities and time restrictions that will benefit from a parent-funded discount, as well as the discount percentage, that in extreme cases can reach 100% (e.g. for using the school bus twice a day). Results data elements representing discounts are further classified as discount-upon-purchase and discount-upon-charge, depending on the level of cooperation by the respective merchant. Coupon module 342C allows the parent to determine on which items, item kinds, merchants, quantities and time restrictions the child will be allowed to generate paper or electronic coupons through child interface 370. The choice between coupons and discount is based on merchant considerations (e.g. some merchants may prefer redeeming paper coupons rather than reprogramming their POS to grant individual discounts according to the parent-selected rules data elements), on promotional effectiveness (for example, some children may be more effectively driven by tangible paper coupons than by abstract discounts), or just for providing a variety of options. Rebate module 342R receives from the parent rules data elements for granting a rebate against a proof-of-purchase that will be provided in paper or electronic form. Rebates are less convenient to the child and require more complex handling and processing by incentive settlement system 344, but may be called for promoting sales with merchants who are not cooperating with the system, especially when the parent is interested in promoting specific items (in this case even discount-upon-charge cannot be effected because the common charge report by the merchant to charge back-end system 280 is not itemized). Gift module 342G allows the parent to promote selected items, merchants, item kinds quantities and time restrictions by parent-funded gifts, that are granted upon purchase or upon presenting a proof-or-purchase, and are delivered either upon purchase, or later by mail or electronically.

Figure 8:
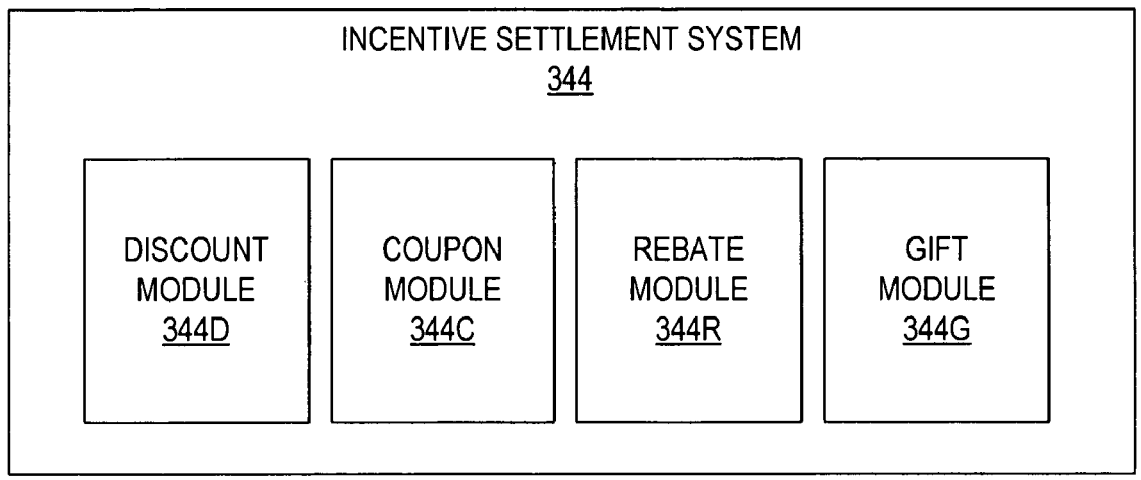
FIG. 8 is a simplified block diagram of an incentive settlement system according to a preferred embodiment of the present invention.

FIG. 8 zooms into the main modules of incentive settlement system 344 of FIG. 6. These modules are responsive to the parent's entries into incentive management system 342, described above, which are stored in and retrieved from rules data field 314 of child account 350 (FIG. 3). Discount module 344D works in one of two modes: discount-upon-purchase or discount-upon-charge. If the merchant cooperates with the system of the present invention then his merchant POS 328 can programmed to recognize the card, communicate through back-end system 340 with child account 350 to retrieve rules data elements 314, and check whether the card is eligible for a parent-funded discount with respect to the instant purchase. If the answer is positive, then discount module 344D is called to execute the transaction, by splitting the respective charges between the parent account and the child account and reporting them accordingly. The child will then see the discounted price on his receipt, while the difference will be charged by discount module 344D to the parent's account, transparently to the child. With discount-upon-charge, the child will see a normal, full-price charge on his receipt, and the discount will be effected by discount module 344D upon settlement, by charging only the discounted amount to the child and charging the rest to the parent. As noted above, discount-upon-charge is relatively easy to implement even with non-participating merchants when the parent approves by merchant 314M (FIG. 3A), and is hard to implement for by item 314A, since the conventional merchant report to back-end system 340 does not include an itemized purchase list but only the total to be charged. Rebate Module 344R accepts electronic proof-of-purchase reports, derived from mailed-in paper receipts, electronic receipts or emailed child statements. Upon verifying that such a report matches the rebate rules data previously entered by the parent through rebate module 342R of incentive management system 342, rebate module 344R effects a respective credit to child account 350 and charges the same amount to parent account 360. Gift module 344G checks purchase or proof-of-purchase details against the gift rules previously entered by the parent through gift module 342G of incentive management system 342, and generates any of a gift instruction to the merchant, a gift certificate for the child, an instruction to a gift center for mailing a gift to the child, or an Internet or mobile link to an electronic gift such as a music piece, a movie clip or a ring tone.

In all the cases above, incentive settlement system 344 records, monitors and checks the data elements representing the purchase quantities and compares them to the rules data 314Q (quantity restrictions) and rules data 314T (time restrictions) (FIG. 3A) defined by the parent, if such data exist, and allow discounts only on purchases that are contained within such restrictions.

Figure 9:
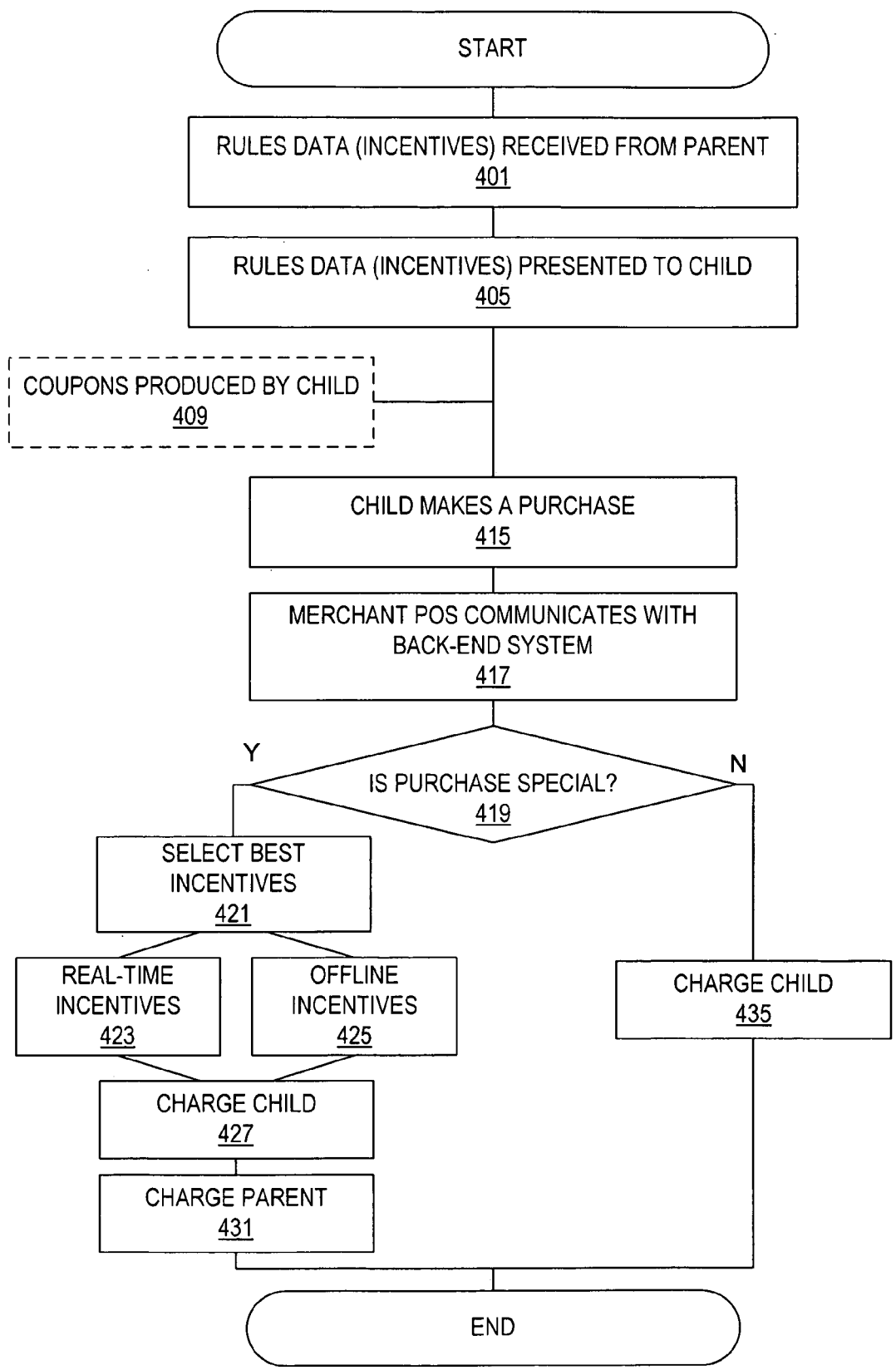
FIG. 9 is a simplified flowchart describing the operation of a transaction system constructed according to a preferred embodiment of the present invention.

FIG. 9 is a schematic high-level flowchart of the operation of a system constructed in accordance to a preferred embodiment of the present invention. The description below makes reference also to FIGS. 3-8. In a step 401 rules data elements representing intended incentives are received by incentive management system 342 of back-end system 340 through parent control 304 and are recorded in rules data field 314 of child account 350. In a step 405, the child uses child interface 370 to browse through the rules stored in rules data field 314 of his account 350. In an optional step 409, the child uses child interface 370 to communicate with coupon module 344C of incentive settlement system 344 to produce paper or electronic coupons that are offered according to the rules he has seen in step 504. In a step 415 the child makes a purchase, the purchased items are scanned or entered into merchant POS 328, and the child presents his child card 150 at merchant POS 328.

Steps 415-435 differ in some aspects of their content, depending on whether the merchant participates in granting real-time incentives (discount-upon-purchase, coupon redemption or gift-upon-purchase) according to the present invention. The following relates to a merchant that does participate in granting such real-time incentives. Step 415 may then also include receiving a coupon previously generated in step 409. In a step 417 merchant POS 328 communicates with back-end system 340 for authorization and for retrieving the specific rules data elements 314 of the respective child account 350. In a step 419, the purchased items received in step 415 are compared with the data retrieved in step 417; if no items eligible for incentives are identified, then in a step 435 the purchase is charged conventionally, i.e. for its full price. If in step 419 the purchase recorded in step 415 is found special (i.e. there are matches between the rules data and some or all of the condition data representing the purchased items), then, in a step 421, it is checked whether there are more than one matches related to each specific eligible item; for example, one rule represented by rules data 314 may offer the child 50% discount on any book purchase, while another data element 314 may represent a 70% discount on a certain book; if a specific condition data element matches multiple rules data elements, then step 421 will select the best incentive for the child, i.e. 70% discount if he buys that certain book. In a step 423, real-time incentives (such as discount-upon-purchase, coupon redemption upon purchase, or gift-upon-purchase) are granted through the programming of merchant POS 328, while in a step 425 offline incentives (such as discount-upon-charge, rebates and deferred gifts) are executed later, by incentive settlement system 344 of back-end system 340, without merchant POS 328 being involved. Upon settlement of the transaction, then in a step 427 the child account 350 is charged the discounted amounts and receives the appropriate rebates, while in a step 431 the parent account 360 is charged for the discounts and rebates.

Continuing with steps step 415-435 of FIG. 9, focus is now placed on the case that no real-time incentives are supported by merchant POS 328. Step 415 does not include the option of receiving coupon for immediate redemption. Step 417 includes only conventional authorization and transaction communication, step 419 is contained within incentive settlement system 344 of back-end system 340 without merchant POS 328 being involved or aware of, and step 423 of real-time incentives becomes irrelevant and is skipped. Step 425 of granting off-line incentives and steps 427 and 431 of charging the child and parent accounts, respectively, and step 435 of charging the child account conventionally, are as described above.

Figure 10D:
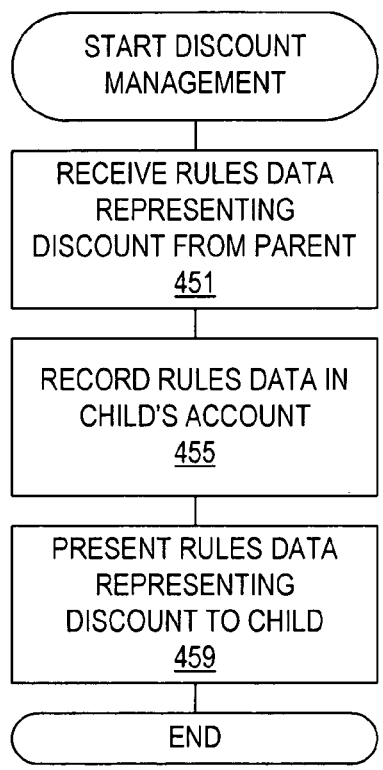
FIG. 10D is a simplified flowchart describing discount management according to a preferred embodiment of the present invention.
Figure 10C:
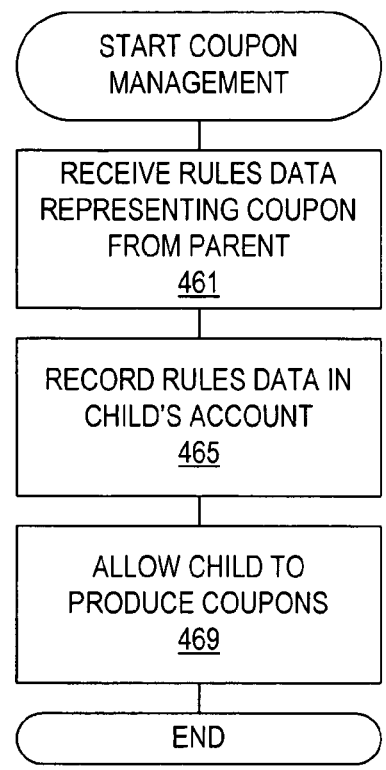
FIG. 10C is a simplified flowchart describing coupon management according to a preferred embodiment of the present invention.
Figure 10R:
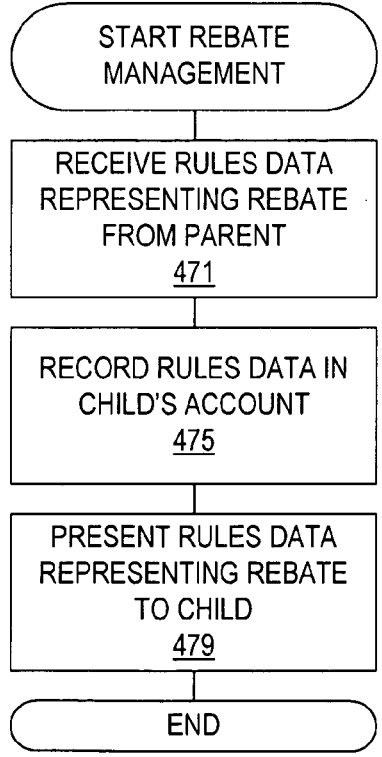
FIG. 10R is a simplified flowchart describing rebate management according to a preferred embodiment of the present invention.
Figure 10G:
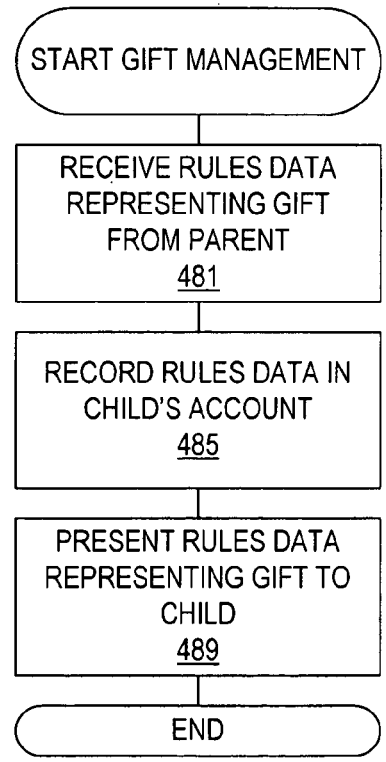
FIG. 10G is a simplified flowchart describing gift management according to a preferred embodiment of the present invention.

FIGS. 10D-C-R-G schematically describe the operation of the four modules (FIG. 7) of incentive management system 342 of back-end system 340. Reference is made in the following description also to FIGS. 5-7. Thus, FIG. 10D describes the operation of discount module 342D. In a step 451 the parent uses parent control 304 to review and enter rules data intended to produce discount-type results data, specifying what discount rates are granted by merchant 314M, by item 314A, by kind 314K, under quantity restrictions 314Q and within time restrictions 314T (FIG. 3A). In a step 455 discount module 342D records these rules data elements in rules data field 314 of child account 350. In a step 459, the child can use child interface 370 to communicate with his child account 350 to view the discount rules data elements from rules data field 314, to effect his purchase preferences. FIG. 10C describes the operation of coupon module 342C. In a step 461 the parent uses parent control 304 to review and enter rules data intended to produce coupon-type results data, specifying what coupon values or rates are granted by merchant 314M, by item 314A, by kind 314K, under quantity restrictions 314Q and within time restrictions 314T (FIG. 3A). In a step 465 coupon module 342C records these rules data elements in rules data field 314 of child account 350. In a step 469, the child can use child interface 370 to communicate with his child account 350 to view the coupon rules data elements from rules data field 314 to effect his or her purchase preferences, and produce paper or electronic coupons for his or her planned purchases. FIG. 10R describes the operation of rebate module 342R. In a step 471 the parent uses parent control 304 to review and enter rules data intended to produce rebate-type results data, specifying what rebates are granted by merchant 314M, by item 314A, by kind 314K, under quantity restrictions 314Q and within time restrictions 314T (FIG. 3A). In a step 475 rebate module 342R records these rules data elements in rules data field 314 of child account 350. In a step 479, the child can use child interface 370 to communicate with his child account 350 to view the rebate rules data elements from rules data field 314, to affect his purchase preferences. FIG. 10G describes the operation of gift module 342G. In a step 481 the parent uses parent control 304 to review and enter rules data intended to produce gift-type results data, specifying what gifts are granted by merchant 314M, by item 314A, by kind 314K, under quantity restrictions 314Q and within time restrictions 314T (FIG. 3A). In a step 485 gift module 342G records these rules data elements in rules data field 314 of child account 350. In a step 489, the child can use child interface 370 to communicate with his child account 350 to view the gift rules data elements from rules data field 314, to affect his purchase preferences.

Figure 11D:
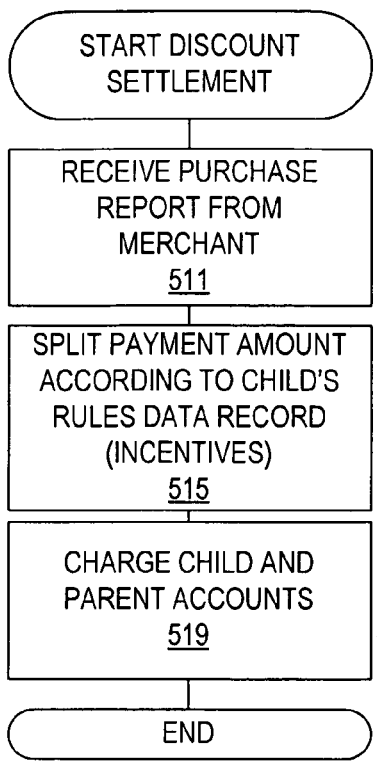
FIG. 11D is a simplified flowchart describing discount settlement according to a preferred embodiment of the present invention.
Figure 11C:
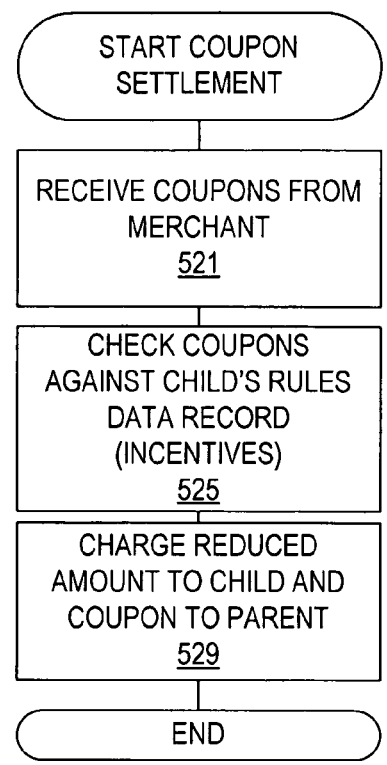
FIG. 11C is a simplified flowchart describing coupon settlement according to a preferred embodiment of the present invention.

FIGS. 11D-C-R-G schematically describe the operation of the four modules (FIG. 8) of incentive settlement system 344 of back-end system 340. Reference is made in the following description also to FIGS. 5-8. Reference is now made to FIG. 11D, which describes the operation of discount module 344D. In a step 511, discount module 344D of incentive settlement system 344 receives the purchase report from merchant POS 328. In a step 515 the purchase report is analyzed by discount module 344D, in comparison to the rules data elements intended to produce discount-class results data from rules data field 314 of child account 350, to identify whether the entire purchase or specific items are eligible for discounts; the data available for the analysis is dependent on whether the merchant cooperates with the system of the present invention (then the merchant report can be itemized) and by whether discount rates are granted by merchant 314M, by item 314A, by kind 314K, under quantity restrictions 314Q and within time restrictions 314T (FIG. 3A); once the eligibility for discounts is determined, discount module 344D calculates what part of the purchase amount is to be charged to child account 350, and what part is to be charged to parent account 360. In a step 519, the amounts calculated in step 515 are charged to child account 350 and parent account 360, and the particulars are recorded into child account 350 (log 112) and the log of parent account 360 (not shown) for generating the monthly statement.

FIG. 11C describes the operation of coupon module 344C. In a step 521, coupon module 344C of incentive settlement system 344 receives the purchase report and coupon report from merchant POS 328. In a step 525 the reported coupons are analyzed by coupon module 344D, in comparison to the rules data elements intended to produce coupon-class results data from rules data field 314 of child account 350, to confirm the validity of the reported coupons; the data available for the analysis is dependent on whether the merchant cooperates with the system of the present invention (then the merchant report can be itemized) and by whether coupons are granted by merchant 314M, by item 314A, by kind 314K, under quantity restrictions 314Q and within time restrictions 314T (FIG. 3A); once the validity of coupons is determined, coupon module 344C calculates what part of the purchase amount is to be charged to child account 350 after the coupon values are deducted, and what part is to be charged to parent account 360 for paying for the coupons. In a step 529, the amounts calculated in step 525 are charged to child account 350 and parent account 360, and the particulars are recorded into child account 350 (log 112) and the log of parent account 360 (not shown) for generating the monthly statement.

Figure 11R:
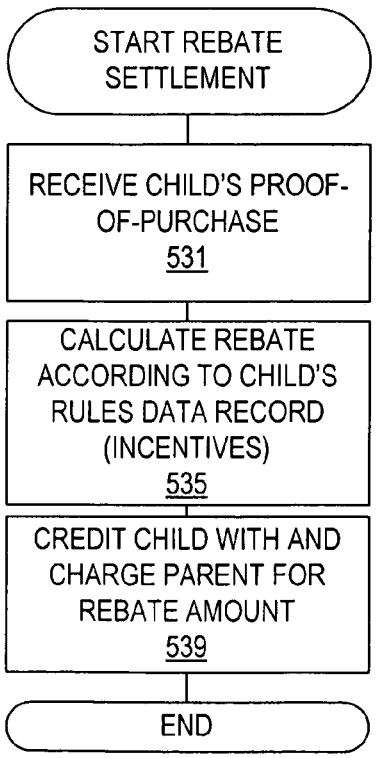
FIG. 11R is a simplified flowchart describing rebate settlement according to a preferred embodiment of the present invention.

FIG. 11R describes the operation of rebate module 344R of incentive settlement system 344. In a step 531, rebate module 344R of incentive settlement system 344 receives a proof-of-purchase evidence from the child, e.g. in the form of a paper receipt, electronic receipt, or an electronic statement filled-in by the child; in the case of paper receipts, rebate module 344R preferably includes means to scan and recognize such receipts. In a step 535 the proof-of-purchase evidence is analyzed by rebate module 344R, in comparison to the rules data elements intended to produce rebate-class results data from rules data field 314 of child account 350, to identify the validity of the evidence and the associated rebate amount. Then in a step 539 the rebate amount is credited (i.e. added) to child account 350 and charged to parent account 360, and the particulars are recorded into child account 350 (log 112) and the log of parent account 360 (not shown) for generating the monthly statement.

Figure 11G:
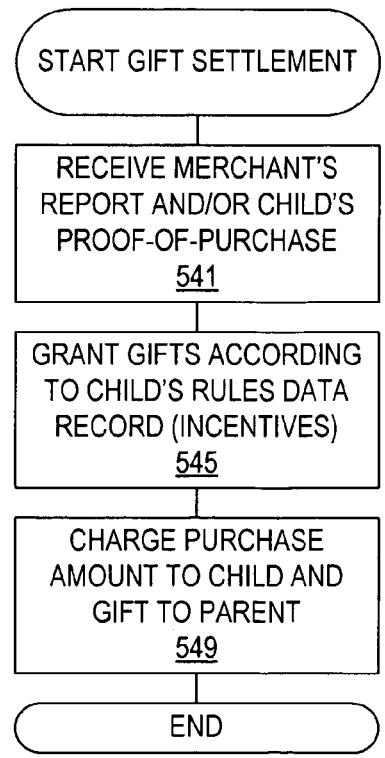
FIG. 11G is a simplified flowchart describing gift settlement according to a preferred embodiment of the present invention.

FIG. 11G describes the operation of gift module 344G of incentive settlement system 344. In a step 541, gift module 344G of incentive settlement system 344 receives the purchase report from merchant POS 328 or a proof-of-purchase evidence from the child, e.g. in the form of a paper receipt, electronic receipt, or an electronic statement filled-in by the child; in the case of paper receipts, gift module 344G preferably includes means to scan and recognize such receipts. In a step 545 the purchase report and/or the proof-of-purchase evidence are analyzed by gift module 344G in comparison to the rules data elements intended to produce gift-class results data from rules data field 314 of child account 350, to identify whether the entire purchase or specific items are eligible for gifts; the data available for the analysis is dependent on whether the merchant cooperates with the system of the present invention (then the merchant report can be itemized) and by whether gifts are granted by merchant 314M, by item 314A, by kind 314K, under quantity restrictions 314Q and within time restrictions 314T (FIG. 3A); then gift module 344G effects the grant of the gift by an instruction sent to a participating merchant POS 328, by instructing a gift center to send the gift(s) to the child, or by generating an electronic gift (such as a music track, a video clip or a ring tone) and addressing a link to that gift to the child's email address or mobile phone or posting that link to the child interface 370. Where appropriate, gift module 344G may also send an electronic message to the child and allow him to select a specific gift from a list. In a step 549, the purchase amount is charged to child account 350 (if it has not been already charged to the child before, as in the case of a delayed reception of a proof-of-purchase), and the value of the gift is charged to parent account 360, and the particulars are recorded into child account 350 (log 112) and the log of parent account 360 (not shown) for generating the monthly statement.

FIG. 12 is a table 680 that describes an exemplary segment of the content of rules data field 314 of child account 350 (FIG. 4), as entered by a parent through parent control 304 and viewed by a child through child interface 370 (FIG. 5). The data elements in line 001 specify that the child will be granted 70% discount on lunches at a selected restaurant, up to one lunch per day. The discount is upon-charge, i.e. the child will see the normal meal price upon payment on his receipt, but will see the discount on his statement. The data elements in line 002 show a link to a list of books selected by the parent, which can be purchased in any bookstore, granting a 70% rebate on the respective purchases. In the comment column there is a link to parent-approved rules as to how a proof-of-purchase should be provided by the child rebate module 344R of incentive settlement system 344 (FIG. 8), for example, mail-in paper receipt, electronic receipt from an Internet bookstore, or an emailed statement by the child. The data elements in line 003 define 100% discount upon purchase (i.e. The child will see a 0.00 charge) for up to two daily school bus rides. The data elements in line 004 offer 50% discount upon charge, plus a gift from a linked list, for one visit to a listed theater show per month. The data elements in line 005 offer a link for printing coupons that offer 70% discount when visited a listed movie once a week, but only for Saturday or Sunday shows. Similar offering may follow in the next line, to encourage the child in making certain purchase decisions.

FIG. 13 is a table 684 that describes an exemplary segment of the monthly statement for January for a child whose incentive rules incentive rules 314 record is described by table 680 of FIG. 12. Line 001 describes the carry-on balance from the previous month, and line 002 adds the monthly allowance granted by the parent. Line 003 shows the heavily-discounted charge for a meal at a listed restaurant. Line 004 shows the full price charge for a listed book, which will be effectively reduced by the rebate of line 007, after the proof-of-purchase has been provided by the child. Lines 005 and 006 show the effects of 100% discount and a discount-upon-charge, respectively (the gift associated with line 006 is invisible in this statement, but will be visible in the parent's statement of FIG. 14). Line 008 shows another discounted visit to the listed restaurant, line 009 shows a regular, undiscounted purchase (step 435 of FIG. 9), and line 010 shows the impact of a printed coupon at the movie theater.

Figures 14, 15:
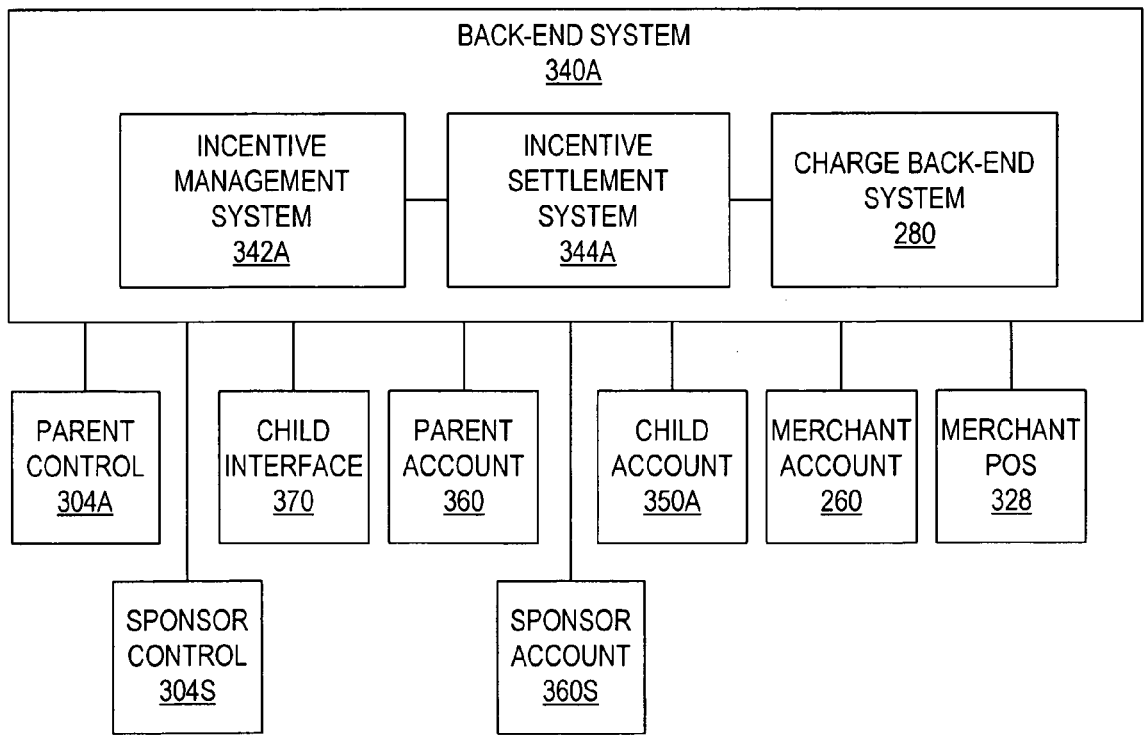
FIG. 14 is a simplified table describing an exemplary parent statement according to a preferred embodiment of the present invention.
FIG. 15 is a simplified block diagram of a back-end system according to an alternative preferred embodiment of the present invention.

FIG. 14 shows table 688 that demonstrates the impact of the child transactions from table 684 of FIG. 13 on the parent's monthly incentive report. Thus, line 001 shows the impact of the monthly allowance, which charges the parent account $70.00. Lines 002, 003 and 006 charge the parent for the child's discount at the listed restaurant and school bus, line 004 charges the parent for both the discount and gift at the theater, line 005 charges the parent for the rebate at the bookstore, and line 007 charges the parent for the coupon redemption at the theater.

It will be noted that in the example of FIG. 14, the parent has heavily subsidized the child payments, actually by funding an extra $47.00 of incentives within a week for a $70.00 monthly allowance. It is the option of the parent, when entering the incentive rules (step 401 of FIG. 9), to determine the incentive size and quantitative restrictions, and the balance between the size of the basic allowance and that of the incentives. Thus, one parent willing to spend $200 on his child's monthly expenses, may do so through $70 basic allowance and $130 incentives, while another parent may give the child more freedom of choice through a $150 basic allowance and $50 of incentives. The amounts and balances are dependent on financial and educational considerations and are for parents to decide.

Additional Sponsors

The description above related to a child account sponsored by a parent. The term "parent" should be interpreted broadly, to include also a guardian, or a pair of parents that cooperate as a single entity to provide an allowance and incentives to the child.

A special case of interest that extends the scope of the present invention is of having additional sponsors. For the sake of clarity, the following discussion will be limited to a single additional sponsor, with the extension to multiple additional sponsors being straightforward. An additional sponsor can be a long-term sponsor, such as a second parent in case of a divorced couple, or a short term sponsor such as an uncle providing a birthday present. According to the present invention, there is always a single primary sponsor, that will be called herein "parent", while a secondary sponsor will be called just "sponsor".

FIG. 15 describes a preferred embodiment of the present invention, involving both a parent and a sponsor. The parent is the dominant player, and needs to approve the sponsor's entries into the system. Backend system 340A is similar to backend system 340 of FIG. 6, with extended functionalities for incentive management system 342A and incentive settlement system 344A in comparison to incentive management system 342 and incentive settlement system 344 of FIG. 6. Incentive management system 342A receives rules data not only from parent control 304A but also from sponsor control 304S; in addition, it checks and reports such rules data to the parent through parent control 304A, as will be described in FIG. 16 below. Incentive settlement system 344A manages also the rules data entered by the sponsor and approved by the parent, and charges the respective accounts. Parent control 304A includes a new functionality, in comparison to parent control 304, of checking and approving the sponsor's rules data elements. Sponsor control 304S is similar to parent control 304 in enabling the entry of rules data elements, but the sponsor is expected to revisit sponsor control 304S to verify that the rules data elements representing his intended incentive rules have been validated by the system and the parent, or modify them according to the parent's comments. Sponsor account 360S is either a long-term credit or debit account (as in the case of a second parent), or an ad-hoc prepaid account of a predefined capacity (as in the case of a birthday present). Child account 350A includes, in its rules data field 314, rules data elements entered by both the parent and the sponsor, preferably identifying the source rules (e.g. by adding a "source" column to FIGS. 12 and 13). Blocks 280, 370, 360, 260 and 328 are similar to their counterparts of FIG. 6.

Figure 16:
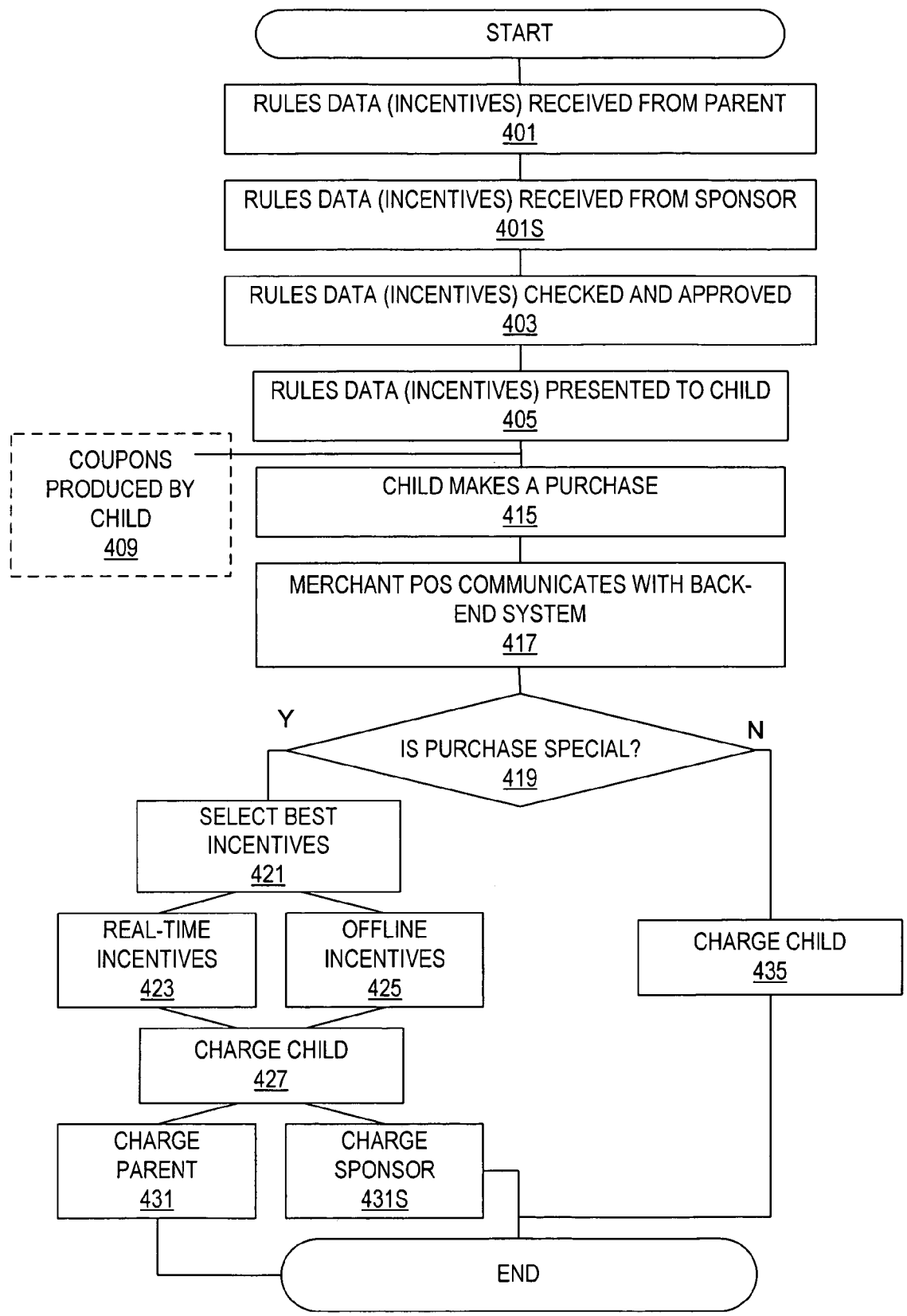
FIG. 16 is a simplified flowchart describing the operation of the preferred embodiment of FIG. 15.

FIG. 16 describes the operation of the preferred embodiment of FIG. 15. It is similar to the operation described in FIG. 9, with the addition of the steps listed herein. In a step 401S, incentive management system 342A receives the sponsor's rules data elements via sponsor control 304S. In a step 403, the rules entered in step 401S are checked by incentive management system 342A and by the parent, and are either approved or rejected and commented to give the sponsor another opportunity to enter rules data elements representing intended incentives that will be accepted (this second iteration is not shown). The sponsor-entered rules data are first checked by incentive management system 342A for consistency with the parent-entered rules data. For example, if a sponsor offer the child a discount of 20% on books and the parent has offered a 50% discount on the same items, the sponsor's rules data will always be rejected by step 421, and will become useless. Thus, generally, the sponsor's rules data should relate to items not subsidized or having a limited subsidy by the parent. Then the sponsor's rules data elements will be presented by incentive management system 342A for the parent approval through parent control 304A, and the parent may disapprove certain incentives, e.g. incentives that encourage buying excessive amounts of candies.

The purchase procedure that starts step 415 is similar to that of FIG. 9, with the following difference: rules data selected in step 421 may result in a step 431S of charging—sponsor account 360S for the incentive, instead of step 431 of charging the parent account.

The "sponsor" embodiment may be summarized as follows:

a third account having a third account owner is further associated with the first (or child) account, preferably subject to an entry authorization from the owner of the second account (e.g. a parent or tutor);

further rule data may be defined by the third account owner, with a corresponding specific identification of the third account owner;

optionally, these further rule data may be also submitted to the authorization of the owner of the second account (e.g. a parent or tutor), and/or to a "priority" analysis with respect to the own rule data of the second account owner; alternatively, after the entry authorization has be given, the third account owner might freely enter his further rules, with the whole set of rules data (whether from second or third account) being compared with the purchase particulars like if they were all from the second account;

where a rule data entered by the third account owner is being matched, the cost derived from the corresponding result data is charged to the third account.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A computer assisted transaction method, using a payment card being associated with a first account having a first account holder, said first account being in turn associated with a second account having a second account holder, the method comprising:

receiving rule data from said second account holder, in connection with said payment card, said rule data associating condition data with corresponding result data;

receiving data of a specific purchase made using the payment card;

processing an incentive when the data of the specific purchase matches condition data in said rule data, the processing further comprising: deriving actual result data from one or more condition data being matched; executing a transaction related to said specific purchase with modifications derived from said actual result data, thereby charging to said first account an actual payment amount which is greater than zero and does not exceed the specific purchase's cost; and charging a cost derived from said actual result data to said second account; and executing the transaction for the specific purchase by the payment card when the specific purchase does not match the condition data in the rule data wherein executing the transaction further comprises charging a cost of the specific purchase to the first account.

2. The method of claim 1, wherein said actual payment amount is reduced, in comparison to the specific purchase's cost, by a discount amount derived from actual result data, and wherein charging the cost further comprises charging a cost which includes said discount amount.

3. The method of claim 1, wherein said actual payment amount is reduced, in comparison to the specific purchase's cost, by a coupon value derived from-the actual result data, and wherein charging the cost further comprises charging a cost which includes said coupon value.

4. The method of claim 1, wherein executing the transaction further comprises applying a rebate that credits the first account by a rebate amount, and wherein charging the cost further comprises charging a cost which includes said rebate amount.

5. The method of claim 4, wherein receiving rule data from said second account holder further comprises receiving condition data including a receipt of a proof-of-purchase evidence, associated with actual result data, and wherein executing the transaction further comprises receiving a proof-of-purchase evidence, to determine whether such condition data are being matched.

6. The method of claim 1, wherein executing the transaction further comprises delivering a gift, and wherein charging the cost further comprises charging a cost which includes the cost of said gift.

7. The method of claim 1, wherein said condition data further comprises at least one condition selected from the group consisting of merchant-related condition data, item-related condition data, kind-related condition data, quantity restricting condition data and time restricting condition data.

8. The method of claim 1, wherein the first account holder is a child and the second account holder is a parent.

9. The method of claim 8 further comprising providing a sponsor of the first account holder wherein the sponsor provides sponsor rule data, in connection with said payment card, said sponsor rule data associating condition data with corresponding result data.

10. A transaction system, comprising:
a card for use by a first account holder to effect payments from a first account;
a second account of a second account holder, said first account being associated with the second account;
a merchant point of sale system for receiving the card for payment; and
a back-end system operative to:
maintain rule data in connection with said card, said rule data associating condition data with corresponding result data, and said rule data being editable by said second account holder, and viewable by said first account holder;
receive a specific purchase to be paid using said card at said merchant point of sale system,
process an incentive when the specific purchase matches condition data in said rule data by: deriving actual result data from one or more condition data being matched; enforcing a modified transaction related to said specific purchase with modifications derived from said actual result data, the modified transaction includes charging at least part of said specific purchase's cost to said first account; and charging cost derived from said actual result data to said second account; and
execute the transaction for the specific purchase by the card when the specific purchase does not match the condition data in the rule data by charging a cost of the specific purchase to the first account.

11. The system of claim 10, wherein receiving the specific purchase further comprises communicating with said merchant point of sale system.

12. The system of claim 11, wherein enforcing the modified transaction is effected by said back-end system communicating with said merchant point of sale system.

13. The system of claim 10, wherein receiving the specific purchase further comprises receiving a proof-of-purchase evidence without communicating with said point of sale system.

14. The system of claim 10, wherein said modified transaction has a discount that reduces said specific purchase price by a discount amount, and said cost includes said discount amount.

15. The system of claim 10, wherein said modified transaction has a coupon that reduces said specific purchase price by a coupon value, and said cost includes said coupon value.

16. The system of claim 10, wherein said modified transaction has a rebate that credits said first account by a rebate amount, and said cost includes said rebate amount.

17. The system of claim 1, wherein said modified transaction includes a gift, and said cost includes said gift's cost.

18. The system of claim 10, wherein said condition data comprises at least one condition selected from the group consisting of merchant-related condition data, item-related condition data, kind-related condition data, quantity restricting condition data and time restricting condition data.

19. The system of claim 10, wherein the first account holder is a child and the second amount holder is a parent.

20. The system of claim 19 further comprising a sponsor of the first account holder, wherein the sponsor provides sponsor rule data, in connection with said card, said sponsor rule data associating condition data with corresponding result data.

21. A back-end system cooperating with a merchant point of sale system that receives a card of a first account holder to effect payment from a first account for a specific purchase, the first account being associated with a second account of a second account holder, the back-end system comprising:
a charge back-end system for effecting charge operations to the first account and the second account;
an incentive management system operative to maintain rule data in connection with the card, said rule data associating condition data with corresponding result data, and said rule data being editable by said second account holder, and viewable by said first account holder; and
an incentive settlement system operative to receive the specific purchase from the merchant point of sale system, and process an incentive when the specific purchase matches condition data in said rule data by: deriving actual result data from one or more condition data being matched, and enforcing a modified transaction related to the specific purchase with modifications derived from said actual result data, the modified transaction includes: operating said charge back-end system to charge at least part of said specific purchase's cost to said first account, and operating said charge back-end system to charge cost derived from said actual result data to said second account; and
the incentive settlement system operative to execute the transaction for the specific purchase by the payment card when the specific purchase does not match the condition data in the rule data by charging a cost of the specific purchase to the first account.

* * * * *